United States Patent
Miomo et al.

(10) Patent No.: US 7,539,106 B2
(45) Date of Patent: May 26, 2009

(54) DATA PROCESSING DEVICE AND DATA COPYING METHOD

(75) Inventors: Takahiro Miomo, Higashiosaka (JP); Junya Kaku, Itami (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 220 days.

(21) Appl. No.: 10/224,436

(22) Filed: Aug. 21, 2002

(65) Prior Publication Data

US 2003/0038997 A1 Feb. 27, 2003

(30) Foreign Application Priority Data

Aug. 23, 2001 (JP) ............................. 2001-252250

(51) Int. Cl.
*G11B 7/00* (2006.01)
(52) U.S. Cl. ............... 369/53.24; 369/47.13; 369/47.12
(58) Field of Classification Search .................... 369/84, 369/47.12, 47.13, 53.24; 707/104.1
See application file for complete search history.

(56) References Cited

U.S. PATENT DOCUMENTS 5,136,391 A * 8/1992 Minami ....................... 386/33
5,233,340 A * 8/1993 Yamaguchi et al. ......... 345/690
6,097,399 A * 8/2000 Bhatt et al. ................. 345/440
2001/0043366 A1* 11/2001 Kameyama ................. 358/403

FOREIGN PATENT DOCUMENTS

| JP | 6-162022 | 6/1994 |
|---|---|---|
| JP | 6-348557 | 12/1994 |
| JP | 10-63458 | 3/1998 |
| JP | 2000-311106 | 11/2000 |

* cited by examiner

*Primary Examiner*—Wayne R Young
*Assistant Examiner*—Van N Chow
(74) *Attorney, Agent, or Firm*—Kratz, Quintos & Hanson, LLP

(57) ABSTRACT

For use in copying data between a plurality of recording media, the present invention provides a data processing device adds up the amounts of data on a plurality of files recorded on a transmitting medium to thereby detect the total amount of copy data, displays an intermediate result of addition on a display unit while updating the result displayed during a process from the start of addition of the amounts of file data until the completion of addition and displays the final result of addition on the display unit upon the completion of addition. The user is unlikely to feel uneasy even when the detection of the total amount of copy data takes time.

5 Claims, 4 Drawing Sheets

DATA PROCESSING DEVICE AND DATA COPYING METHOD

FIELD OF THE INVENTION

The present invention relates to a data processing device for accumulating a plurality of files, such as image files or voice files, in a plurality of recording media and copying the files from one medium to another medium, and a data copying method.

BACKGROUND OF THE INVENTION

Small-sized memory cards having a capacity of tens of megabytes have heretofore been used for digital cameras for recording image data obtained by photographing. Such cards include Compact Flash (registered trademark, hereinafter referred to as "CF cards") and Smart Media (registered trademark, hereinafter referred to as "SM cards"). With the memory card inserted in a memory card connector provided on the camera body, image data as to a plurality of freeze-frame pictures or moving pictures can be recorded on the memory card.

However, the number of images to be recorded on one memory card is limited; many memory cards are necessary for saving a large number of images, so that a cumbersome managing procedure is not only required for memory cards but memory cards need to be handled frequently when a desired image is to be retrieved from among a large number of images, hence the problem of troublesome procedures.

Accordingly, the present applicant has developed an electronic album device of the installed type which is loadable with a memory card and adapted to read all image data recorded on the memory card in response to the depression of a save button by the user and record the read data on a CD-R (Compact Disc-recordable) incorporated in the album device (see JP-A No. 2000-311106). The album device is loadable with two kinds of cards, i.e. CF card and SM card, since these two kinds of cards are available as recording media for digital cameras. Data can be copied between the desired one of the two kinds of memory cards and the CD-R. The electronic album device is adapted to write freeze-frame pictures as recorded on about ten memory cards, to a CD-R having a capacity, for example, of 640 MB. Thus, a large quantity of freeze-frame pictures can be collectively managed by the album device.

In the case where one card medium has been filled with image data by photographing images using a digital data outdoors, it is desirable to copy the image data on the card medium to a CD-R or like disk medium of large capacity by the electronic album device described. If this is possible, there is no need to carry a plurality of card media, hence great convenience. Accordingly, studies are under way to compact the electronic album device for portable use.

Portable electronic album devices are frequently used as driven by a battery, so that attention needs to be directed to the consumption of power. For example when data is to be copied between media with a small capacity remaining in the battery, it is likely that the battery capacity is used up during the copying procedure. In order to judge whether the copying procedure can be executed completely, it is necessary to accurately detect the amount of data to be copied from a transmitting medium to a receiving medium (hereinafter referred to as the "total amount of copy data") and the capacity of recording area remaining in the receiving medium (hereinafter referred to as the "data recordable capacity") and to display the result of detection.

The data recordable capacity of the receiving medium can be readily derived from medium management information and is therefore detectable within a short period of time. However, detecting the total amount of copy data on the transmitting medium requires adding up the amounts of data on a plurality of files recorded on the transmitting medium and therefore takes a long period of time. For example, detecting the total amount of data as to thousands of freeze-frame pictures requires at least several minutes. In this case, the user is unable to recognize whether the procedure for detecting the total amount of copy data is being executed normally merely by reference to an access lamp which is turned on to indicate the execution of the detecting procedure. Accordingly there arises the problem that the user must wait for the completion of the detecting process while feeling uneasy.

SUMMARY OF THE INVENTION

An object of the present invention is to provide a data processing device and a data copying method which are usable for copying data between media without making the user feel uneasy.

The present invention provides a data processing device capable of copying data between a plurality of recording media and comprising an arithmetic processor for adding up the amounts of data on a plurality of files recorded on a transmitting medium to thereby detect the total amount of copy data, a display unit for displaying the total amount of copy data detected, and a display controller for displaying an intermediate result of addition on the display unit while updating the result displayed during a process from the start of addition of the amounts of file data by the arithmetic processor until the completion of addition and displaying the final result of addition on the display unit upon the completion of addition.

Stated more specifically, the device further comprises a detector for detecting the data recordable capacity of a receiving medium, and the display controller displays on the display unit the detected data recordable capacity along with the total amount of copy data. The arithmetic processor starts to detect the total amount of copy data upon turning on a power source or a change of medium or in response to a copying command signal.

The data processing device described detects the total amount of copy data on the transmitting medium and the data recordable capacity of the receiving medium when the power source is turned on or upon a change of medium or in response to a copying command signal, and displays the result of detection on the display unit. In detecting the total amount of copy data, an intermediate result of addition is displayed on the display unit while updating the result displayed during the process from the start of addition of the amounts of file data until the completion of addition. Accordingly, the result presented on the display unit enables the user to recognize that the operation of detecting the total amount of copy data is steadily performed.

Further stated more specifically, the display controller comprises a display updater for updating the added value displayed at timing in accordance with the value of at least one of elapsed adding-up processing time, added value and the number of files processed for addition during the process from the start of addition of the amounts of file data by the arithmetic processor until the completion of addition. The display updater comprises an updating interval changer for altering the updating interval in accordance with the value of at least one of the elapsed adding-up processing time, the added value and the number of files processed for addition.

Thus, the added value of amount of file data displayed is updated at suitable intervals to diminish the number of times the display updating is processed. This reduces-the time required for displaying the final total amount of copy data, further resulting in diminished power consumption.

The data processing device of the invention described enables the user to recognize that the operation of detecting the total amount of copy data is executed steadily, by reference to the result on the display unit. This obviates the likelihood that the user will feel uneasy during copying between media.

DETAILED DESCRIPTION OF EMBODIMENT

Figure 1:
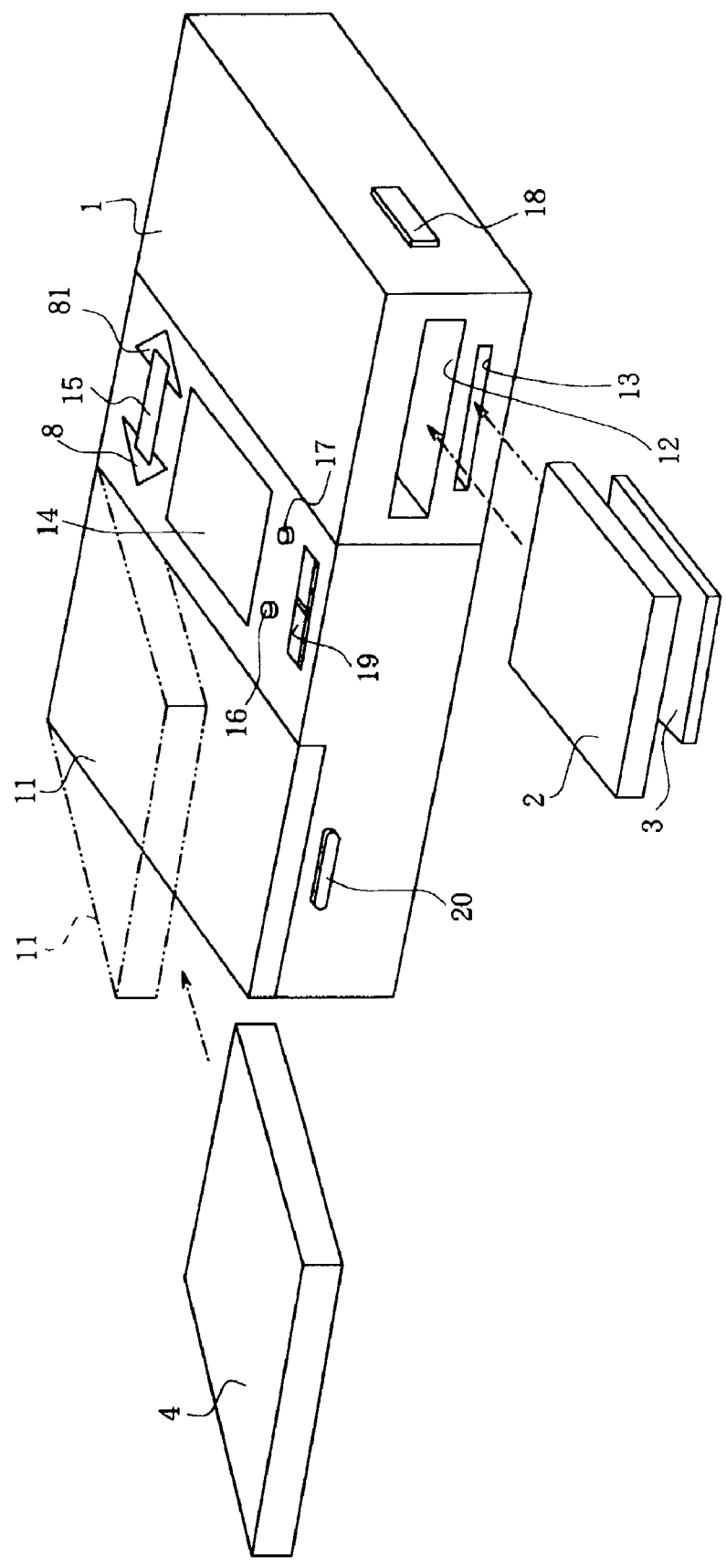
FIG. 1 is a perspective view showing the appearance of a data processing device according to the invention.

The present invention as embodied, for example, in the form of an electronic album device will be described in detail with reference to the drawings. The electronic album device of the invention comprises, as shown in FIG. 1, a portable small case 1 having a CF card inlet 12 and an SM card inlet 13 which are formed in its front wall. A CF card 2 and an SM card 3 can be inserted through the inlets 12, 13, respectively, whereby each of these cards can be set in a predetermined data write/read position.

The case 1 is provided with a lid 11 of the kangaroo pocket type which is opened by manipulating a disk delivery lever 20 as indicated in chain lines. With the lid 11 opened, an optomagnetic disk 4 is loaded onto a holder (not shown) provided on the rear side of the lid 11, and the lid 11 is thereafter closed, whereby the disk 4 can be set in a predetermined recording/playback position.

Provided in the midportion of the surface of the case 1 are a display unit 14 comprising a liquid-crystal display for presenting various information, a save button 15 to be manipulated when data is to be copied between a card medium and a disk medium, a set button 16 to be manipulated when setting one operation as selected from among a plurality of operations presented on the display unit 14, a select button 19 to be manipulated when one operation is to be selected from among a plurality of operations, and a cancel button 17 to be manipulated when the selected operation is to be cancelled.

Arranged on opposite sides of the save button 15 are a first LED 8 and a second LED 81 for indicating whether data is to be copied from one of the CF card 2 and the SM card 3 to the optomagnetic disk 4 or from the disk 4 to one of the CF card 2 and SM card 3. A power source switch 18 is provided on a side wall of the case 1.

With the electronic album device described, image data as to freeze-frame pictures or moving pictures written to the CF card 2 or SM card 3 can be copied to the optomagnetic disk 4 for storing. Alternatively, the image data written to the disk 4 can be copied to the CF card 2 or SM card 3.

Figure 2:
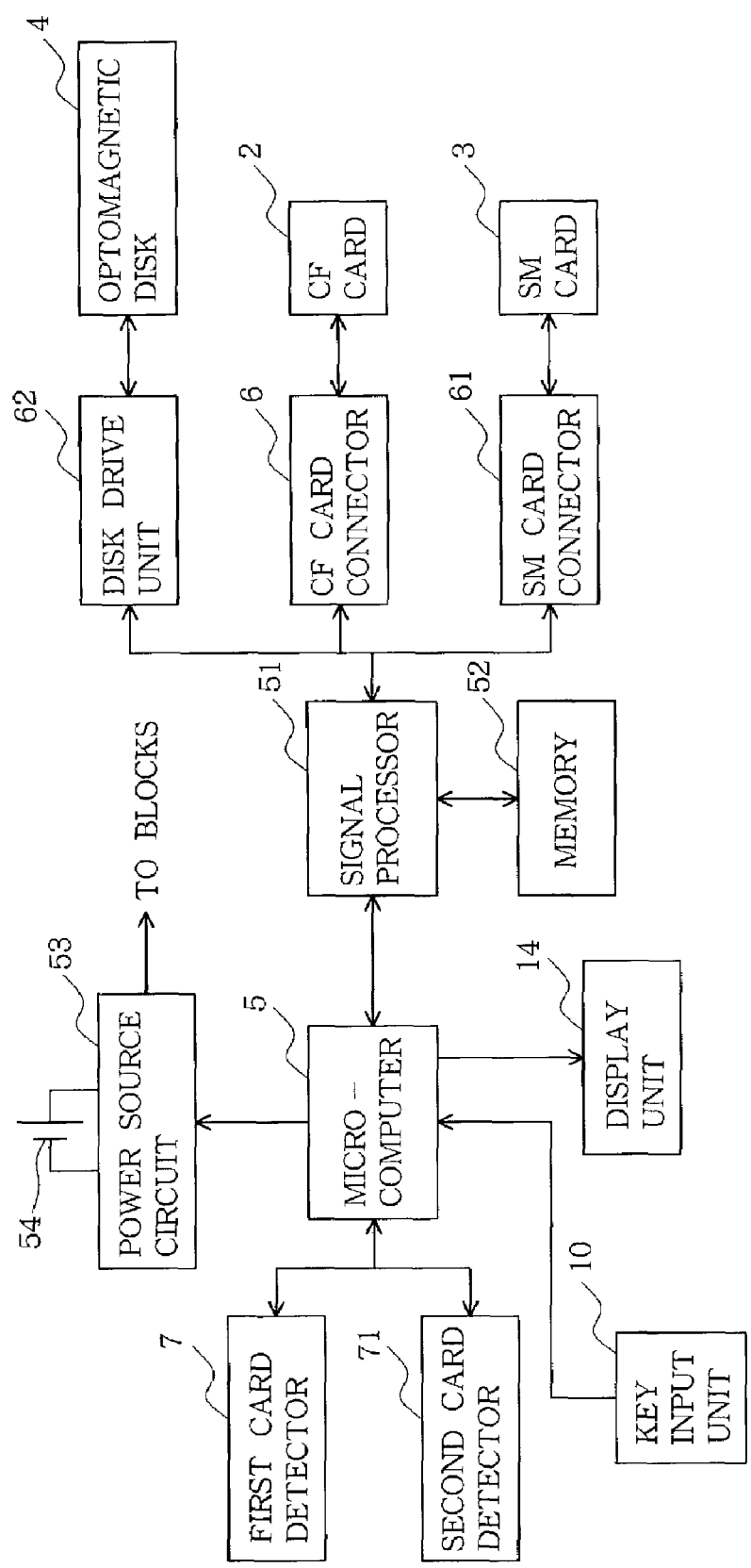
FIG. 2 is a block diagram showing the construction of the data processing device.

FIG. 2 shows the construction of the electronic album device. The device comprises a microcomputer 5 for executing predetermined control operations, and a signal processor 51 comprising an LSI for processing signals as specified while performing communication with the microcomputer 5. Connected to the signal processor 51 are a disk drive unit 62 for driving the optomagnetic disk 4, a CF card connector 6 for the CF card 2 to be inserted in, an SM card connector 61 for the SM card 3 to be inserted in, and a memory 52 for use in processing various data.

Connected to the microcomputer 5 are a first card detector 7 for detecting the CF card 2, a second card detector 71 for detecting the SM card 3, a key input unit 10 comprising various manual buttons described above, the display unit 14, the first LED 8 and the second LED 81. The device has a power source circuit 53 for supplying to circuit blocks the electric power of a battery 54 serving as a power source. The operation of supplying the power is controlled by the microcomputer 5.

With the optomagnetic disk 4 set in the case 1 of the album device described, a CF card 2 having image data written thereto is inserted by the user into the CF card inlet 12 of the case 1, and the save button 15 is depressed, whereby the data is copied from the CF card 2 to the disk 4. Alternatively an SM card 3 having image data written thereto is inserted into the SM card inlet 13 of the case 1, and the save button 15 is depressed. The data is then copied from the card 3 to the disk 4.

When data is to be copied from the disk 4 to the CF card 2 or SM card 3, the setting is changed over by mode selection using the select button 19. At this time, the first LED 8 indicating that the optomagnetic disk 4 has been a receiving medium is turned off, while the second LED 81 indicating that the CF card 2 or SM card 3 is so far serving as a transmitting medium goes on from an off state to show that the disk 4 has changed from the receiving medium to the transmitting medium.

Figure 3:
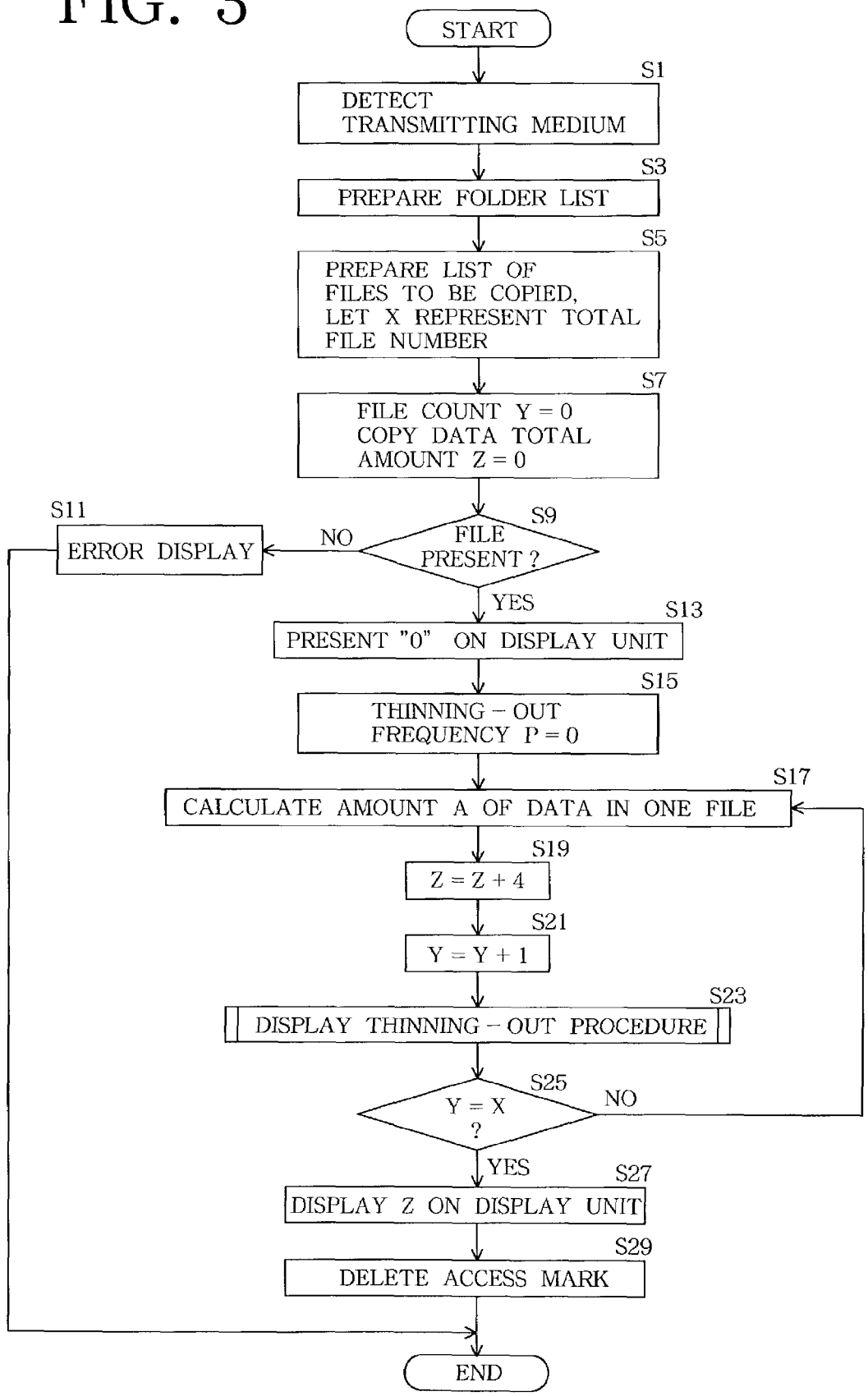
FIG. 3 is a flow chart showing a procedure for detecting the total amount of copy data.

In copying data by the electronic album device, the display unit 14 shows the total amount of copy data on the transmitting medium and the data recordable capacity of the receiving medium. During the process for detecting the total amount of copy data, an icon indicating the operation being performed is displayed, and an intermediate value of total amount of copy data being detected is updated and displayed. FIG. 3 shows a procedure for detecting the total amount of copy data on the transmitting medium.

First, the microcomputer 5 detects a transmitting medium in step S1. When the transmitting medium is a memory card, an inquiry is made as to whether neither of the cards are inserted, both cards are inserted or only one of the cards is inserted, with reference to the detection signals from the first card detector 7 and the second card detector 71. When both cards are inserted, one of the CF card 2 and SM card 3 is accessed in preference. For example if the SM card 3 is selected in preference, the display unit 14 shows an access mark indicating that access to the SM card 3 is started.

The signal processor 51 then prepares in step S3 a folder list for the data recorded on the SM card 3, and stores the list in the memory 52. Based on the folder list, the signal processor 51 prepares in step S5 a list of files saved in each folder, and saves the file list in the memory 52. The total number of files is represented by X.

In the subsequent step S7, a file count Y for counting the number of files processed for adding up is initialized to 0, and a variable Z (hereinafter referred to as the "copy data total amount Z") for calculating the total amount of copy data is initialized to 0. Step S9 thereafter inquires whether a file is present in the file list prepared in step S5. If the inquiry is answered in the negative, step S11 follows to give an error display. When the answer is affirmative, on the other hand, step S13 follows to display on the unit 14 "0" as the copy data total amount Z.

Subsequently in step S15, a display thinning-out frequency P is initialized to 0, followed by step S17, in which the amount A of data in one file to be added up as the amount of data is calculated based on the file list of step S5. The file data amount A is thereafter added to the copy data total amount Z in step S19 to obtain a new copy data total amount Z.

The file count Y is incremented by 1 in the next step S21, followed by step S23 in which the display thinning-out procedure to be described later is executed to determine the display thinning-out frequency to display the copy data total amount as a thinned-out display. Subsequently, an inquiry is made in step S25 as to whether file count Y is equal to total file number X. If the answer is negative, step S17 follows again to calculate the amount of data in the next file. The addition of copy data total amount Z is repeated until the file count Y becomes equal to the total file number X.

When the file count Y thereafter becomes equal to the total file number X, step S27 follows to display on the unit 14 the copy data total amount Z as the final result of detection. The access mark displayed is deleted in step S29, thus notifying the user of the completion of detection.

Figure 4:
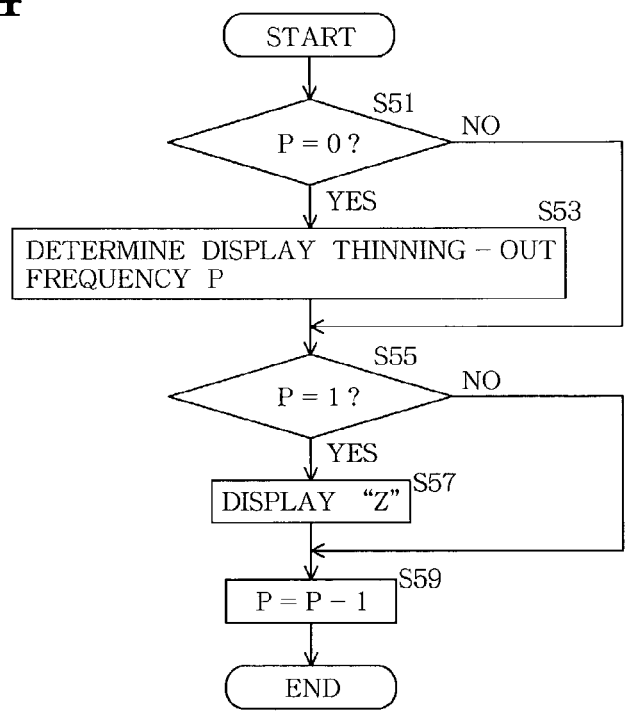
FIG. 4 is a flow chart showing a procedure for giving a reduced number of displays, i.e., thinned-out displays.

FIG. 4 shows the display thinning-out procedure of the foregoing step S21. First step S51 inquires whether the display thinning-out frequency P is 0. If the frequency P is 0, the sequence proceeds to step S53 to execute the procedure to be described below for determining the display thinning-out frequency P, followed by step S55. If the frequency P is at least 1, on the other hand, step S55 follows without performing step S53.

Figure 5:
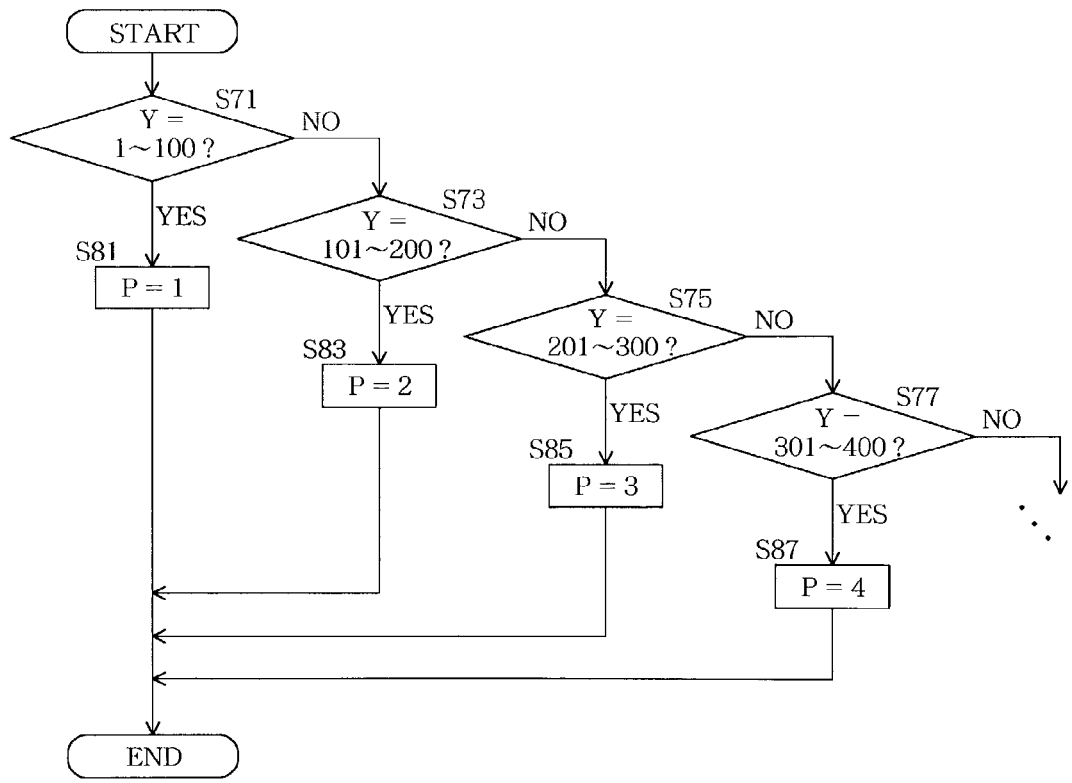
FIG. 5 is a flow chart showing a procedure for setting display thinning-out frequencies.

FIG. 5 shows the procedure for determining the display thinning-out frequency P in step S53 described. First in steps S71, S73, S75, S77, . . . , the value of file count Y is judged. If the file count Y is 1 to 100, the thinning-out frequency P is set at 1 in step S81. If the file count Y is 101 to 200, the thinning-out frequency P is set at 2 in step S83. When the file count Y is 201 to 300, the thinning-out frequency P is set at 3 in step S85. When the file count Y is 301 to 400, the thinning-out frequency P is set at 4 in step S87. When the file count Y is not smaller than 401, the thinning-out frequency P is similarly increased. Upon the thinning-out frequency P increasing to not smaller than the predetermined file count value, a predetermined maximum thinning-out frequency Pmax is maintained. After the thinning-out frequency P is thus determined in accordance with the value of file count Y, the sequence proceeds to FIG. 4, step S55.

An inquiry is made in step S55 as to whether the thinning-out frequency P is 1. When the frequency P is 1, step S57 follows to display on the unit 14 copy data total amount Z which is an intermediate result of detection. If the thinning-out frequency P is over 1, on the other hand, step S59 follows to decrement the frequency P by 1, followed by FIG. 3, step S23.

According to the procedure shown in FIGS. 3 to 5 for detecting the total amount of copy data, the intermediate result of detecting the copy data total amount is updated and displayed during the period from the start of the detection until the completion thereof. The display enables the user to recognize that the procedure for detecting the total amount of copy data is executed steadily. This obviates the likelihood that the user will feel uneasy.

Further in updating and displaying the intermediate result of detecting the copy data total amount, the copy data total amount Z is displayed every time the amount of data in one file is added up in the initial stage of detection procedure, whereas as the detection procedure progresses, the display updating process is thinned out to gradually increase the display updating interval. This eliminates the useless processing that the display is updated although there is no great variation in the copy data total amount Z, consequently leading to shortened detection time and reduced power consumption.

The data processing device of the present invention is not limited to the foregoing embodiment but can be modified variously without departing from the spirit of the invention. For example, various semiconductor memory cards, such as memory sticks and multimedium cards, are usable as recording media in place of SM cards and CF cards.

Further the thinning-out frequency P is increased in accordance with the number of files in the case of the foregoing embodiment, whereas this is not limitative. Usable is a method wherein the elapsed time after the start of detection procedure is counted to increment the thinning-out frequency, for example, upon lapse of every minute, a method wherein the thinning-out frequency is incremented every time the added value of file data amount increases, for example, by 1 MB, or a method wherein the thinning-out frequency with the lapse of time and the thinning-out frequency according to the number of the files are compared to use the greater of the two as the thinning-out frequency. Furthermore, the thinning-out frequency can be set by the combination of the desired two or three values from among the lapse of time, the number of files, and the added value of file data amount.

Further according to the foregoing embodiment, all the image files are handled as the files to be copied in step S5 of FIG. 3, whereas this is not limitative; files having a specified expansion can be selected as the files to be copied. In this case, the following method is usable. The presentation on the display unit is changed in the manner of "ALL"→"PICTURE"→"JPG"→"GIF"→"TIF"→"ALL", for example, by manipulating the select button 19, and the set button 16 is manipulated in one of these presentations for setting to thereby select the kind of files to be copied.

What is claimed is:

1. A data processing device capable of copying data between a plurality of recording media and comprising
    an arithmetic processor for adding up the amounts of data on a plurality of files recorded on a transmitting medium to thereby detect the total amount of copy data,
    a display unit for displaying the total amount of copy data detected, and
    a display controller for displaying an intermediate result of addition on the display unit while updating the result displayed during a process from the start of addition of the amounts of file data by the arithmetic processor until the completion of addition and displaying the final result of addition on the display unit upon the completion of addition
    wherein updating and displaying the intermediate result a copy data total amount is displayed every time the amount of data in one file is added up in an initial stage of a detection procedure and as the detection procedure progresses the display updating process is thinned out as a function of at least one of time, file data amount, or number of files to gradually increase a display updating interval.

2. A data processing device according to claim 1 which further comprises a detector for detecting the data recordable capacity of a receiving medium and wherein the display controller displays on the display unit the detected data recordable capacity along with the total amount of copy data.

3. A data processing device according to claim 1 wherein the arithmetic processor starts to detect the total amount of copy data upon turning on a power source or a change of medium or in response to a copying command signal.

4. In copying data between a plurality of recording media, a data copying method comprising executing a process for adding up the amounts of data on a plurality of files recorded on a transmitting medium to thereby detect the total amount of copy data, displaying an intermediate result of addition on a display unit while updating the result displayed during a process from the start of addition of the amounts of file data until the completion of addition and displaying the final result of addition on the display unit upon the completion of addition, wherein when updating and displaying the intermediate result a copy data total amount is displayed every time the amount of data in one file is added up in an initial stage of a detection procedure and as the detection procedure progresses the display updating process is thinned out as a function of at least one of time, file data amount, or number of files to gradually increase a display update interval.

5. A data copying method according to claim 4 wherein the detection of the total amount of copy data is started upon turning on a power source or a change of medium or in response to a copying command signal.

* * * * *